FIG. 2a
FIG. 2b
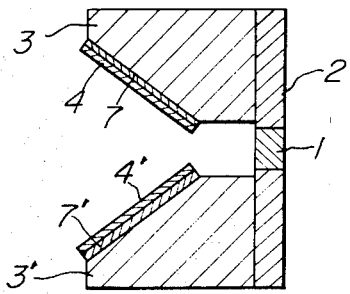
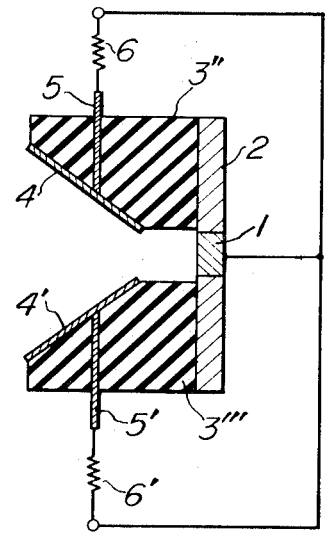
FIG. 3a
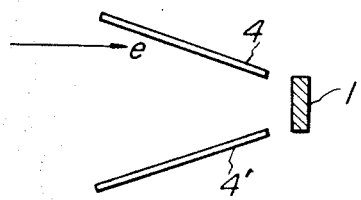
FIG. 3b
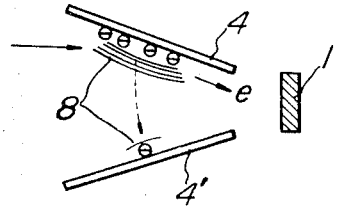
FIG. 3c
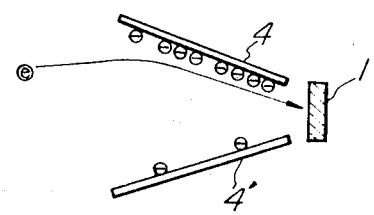
INVENTORS
YOSHIHIRO UNO,
HARUO MAEDA

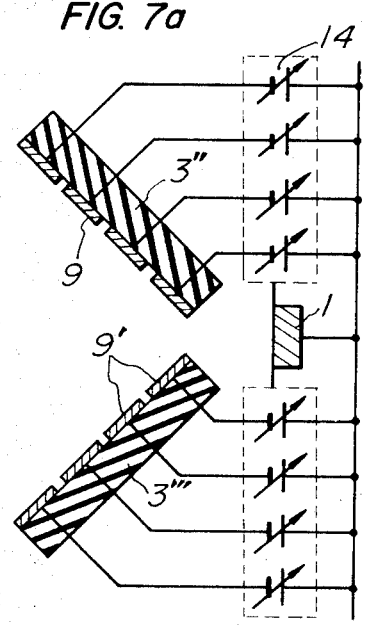
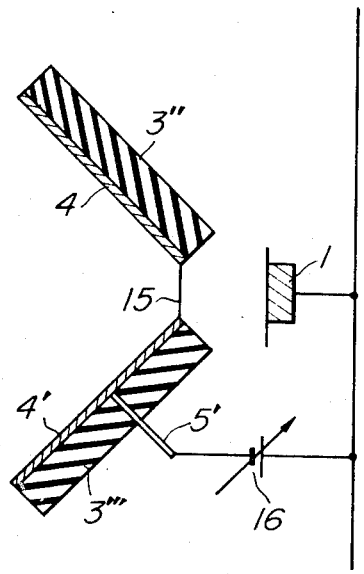
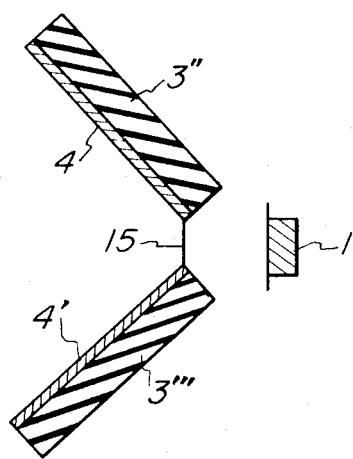

United States Patent Office 3,543,079
Patented Nov. 24, 1970

3,543,079
DEVICE FOR CORRECTING THE PATH OF AN ELECTRON BEAM
Yoshihiro Uno, Machida-shi, and Haruo Maeda, Tokyo, Japan, assignors to Matsushita Electric Industrial Co., Ltd., Osaka, Japan, a corporation of Japan
Filed Dec. 6, 1968, Ser. No. 781,873
Claims priority, application Japan, Dec. 20, 1967, 42/83,073; Dec. 21, 1967, 42/83,060; Dec. 28, 1967, 43/130
Int. Cl. H01j 29/58, 29/70, 29/96
U.S. Cl. 315—3                10 Claims

ABSTRACT OF THE DISCLOSURE

In a cathode ray tube or a similar electronic device having a very narrow target which is usually difficult to be correctly hit by an electron beam from the electron gun, a simple-structured and reliable device for automatically correcting the path of the electron beam, comprising a pair of opposing electrodes positioned in front of and adjacent to said target in order to produce an electrostatic lens for deflecting and converging said beam so that said beam is focused on said target, the potential of said electrodes being maintained by electrons of said beam absorbed by said electrodes or by an external voltage source.

---

This invention relates to a device for correcting the path of an electron beam so that said beam straightly hits the target and for converging said electron beam at the same time.

The device of this invention is particularly useful when it is applied to a cathode ray tube which is provided with a very narrow target, so as to correct the path of the electron beam automatically if the beam tends to miss the target and concurrently to converge said beam in the direction of the width of the target.

This invention will be described hereunder with reference to the attached drawings, in which:

FIGS. 2a and 2b are sectioned vertical views of embodiments respectively of the electron beam positioning device of this invention;

FIGS. 3a, 3b and 3c are diagrams illustrating the manner in which the path of an electron beam is corrected using the device of this invention;

FIGS. 7a, 7b and 7c show three further modified embodiments of this invention.

Figure 1A:
FIGS. 1a, 1b and 1c show patterns of a few examples of the narrow targets.
Figure 1B:

Now, referring to FIG. 1a, the pattern shows an array of pins in an electrostatic printing tube which are formed by etching or by electro-deposition. FIG. 1b shows an array of optical guides in a fibre-optics cathode ray tube, and FIG. 1c, an electron beam pervious window of an electron beam pervious printing tube, which consists of electron beams pervious thin film applied on the face plate of the tube.

Such targets as mentioned above have extremely narrow widths, the order of the dimension being several microns to several hundred microns. Therefore, it is extremely difficult to direct the electron beam exactly to the narrow target over a length of several cm. to several tens of cm., because of electrostatic and electromagnetic interference from the outside, incorrect alignment of the focusing lens and deflecting coils, and distortion of the slit placed over the target due to inaccurate machining.

Generally speaking, in an electronic tube provided with such a target as described above, the electron beam is controlled to deflect in the lengthwise direction of the target at a predetermined repetition rate, while in the width's direction of the target, the path of the beam is corrected so as to exactly hit the target by imparting a correcting DC deflecting action or an AC deflecting action synchronized with the lengthwise diflection, or by controlling the path with a detected and amplified signal from the beam position detecting electrode if such is provided. However, these correcting methods invariably accompany complicated structures or electric circuits and have never brought a satisfactory result.

An object of this invention is to provide a simple-structured device for automatically correcting the path of the electron beam and concurrently converging the electron beam in the direction of the width of the target.

First, two of the embodiments of this invention will be described with reference to FIGS. 2a and 2b.

Figure 1C:

Referring to FIG. 2a, reference numeral 1 indicates a narrow target supported by a support member 2, said target corresponding to the array of pins shown in FIG. 1a, the array of optical guides in FIG. 1b, or the electron beam pervious thin film in FIG. 1c. Numerals 4, 4' indicate a pair of electrodes made of a conductive material of relatively low ratio of secondary electron emission, which are provided, at an appropriate angle and mutual distance, on blocks 3, 3' of metal or other conductive material, in order to deflect and converge the incoming electron beam in accordance with the amount of the projected electrons as will be described hereafter. The nearest distance between the two electrodes 4 and 4' may be set at an appropriate length longer than the width of the target 1, and the distance between the electrodes 4, 4' and the target 1 may be an appropriate length more than zero. As to the inclination of the electrodes 4, 4' to the target 1, said electrodes may assume an appropriate position between a state where said electrodes 4, 4' are parallel to the target 1 and a state where said electrodes 4, 4' are mutually parallel. Numerals 7, 7' indicate electro-resistive layers interposed between the electrodes 4, 4' and the conductive blocks 3, 3' respectively, which act to discharge the electric charge on the electrodes 4, 4' at a rate depending on a time constant determined by the static capacitance of said electrodes 4, 4' and the resistance of the resistive layers 7, 7'.

Referring to FIG. 2b which shows another embodiment of this invention, blocks 3", 3''' are made of a dielectric material, and conductors 5, 5' are connected to the electrodes 4, 4'. Electric charge on the electrodes 4, 4' are discharged through the conductors 5, 5' and resistors 6, 6' which are connected in series to said conductors 5, 5' respectively.

Now, the manner in which the path of an electron beam is corrected according to this invention, will be explained referring to FIGS. 3a, 3b and 3c.

It is assumed that the thickness of the electron beam is less than the minimum distance between the electrodes 4 and 4' or the width of the target 1.

As shown in FIG. 3a, if the electron beam misses the target 1 and hits one of the electrodes 4 at a spot indicated by the arrow, a negative charge will be stored at the spot, resulting in a lower potential at said spot. Therefore, the following electrons will be deviated away from the electrode 4 toward the line of sight of the electron gun as shown in FIG. 3b. After repetition of such a movement, the electron beam will steadily hit the target 1 as shown in FIG. 3c. In FIG. 3b, lines 8 represent the equipotential lines of an electric field produced by the electric charge stored on the electrodes 4, 4'.

The manner in which the above-mentioned electric charge is stored on the electrode 4, will be explained in more detail hereunder.

Figure 5A:
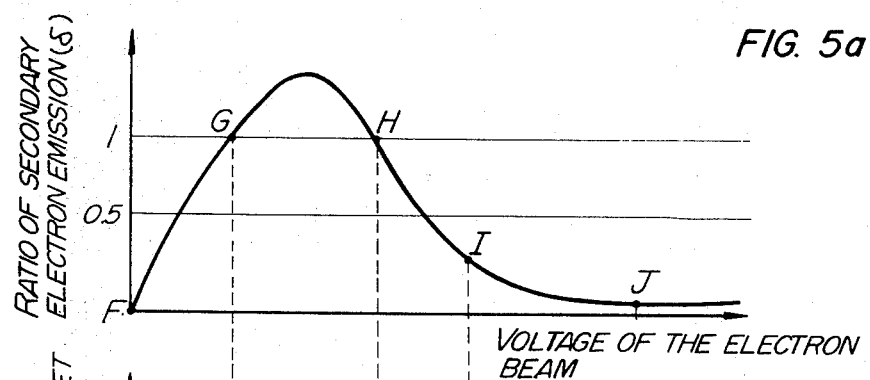
FIGS. 5a and 5b are diagrams for explaining the operation of the device of this invention.

Assuming that an electron beam misses the center of the target and hits the electrode 4 as shown in FIG. 3a, it will be clear that if no emission of secondary electrons occurs, the electrons which hit the electrode 4 will be wholly absorbed by the electrode 4, thereby lowering the potential of said electrode 4. However, practically any material shows more or less a tendency of secondary electron emission which is usually indicated by the emission ratio $\delta$. The ratio $\delta$ depends also on the energy of the electron beam. The general relation between the ratio $\delta$ and the energy of electron beam is shown in FIG. 5a. In this invention, the energy of the impinging electron beam can be set at a sufficiently high value such as indicated by the point J in FIG. 5a. At this point J, it will be noted that the value of $\delta$ is far less than 0.5. The secondary electrons emitted from the electrode 4 are mostly absorbed by the opposite member 4' as the potential is higher on the electrode 4' than on the electrode 4. Since the energy of the majority of the secondary electrons emitted from the electrode 4 is lower than 15 ev. which corresponds to the point F in FIG. 5a, a further emission of secondary electrons due to the first secondary electrons can be disregarded. Therefore, assuming that the electric charge of the electrons impinging on the electrode 4 is Q, the static capacity of the electrodes 4, 4' is C, the resistance of the resistors 3, 3' is R, and the ratio of the secondary electrons absorbed by the electrode 4' to all the produced secondary electrons is $\alpha^{25}$, the potentials of the electrodes will drop by the following amount at the instant when the electrons impinged on the electrode 4:

On the electrode 4 _____ $Q(1-\delta)/C$
On the electrode 4' _____ $\alpha Q\delta/C$ Therefore, the electron beam undergoes a deflecting force coresponding to the difference of potential between said two electrodes 4 and 4', that is:

$$\frac{Q}{C}\{1-(1+\alpha)\delta\} \geq \frac{Q}{C}(1-2\delta)$$

Further, the electron beam undergoes also a converging action as will be described afterwards. As is seen from the above formula, to ensure the deflecting action of the electrodes, the ratio $\delta$ must be less than 0.5. Meanwhile, the electric charge on the electrodes 4, 4' is discharged at a rate determined by a time constant CR. The rate of discharge is affected also by the scanning speed of the electron beam, the quantity of electrons, etc.

Figure 4A:
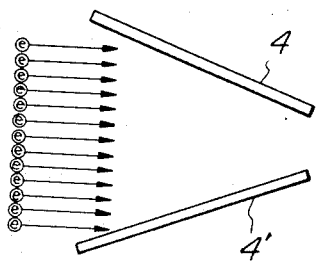
FIGS. 4a, 4b, 4c and 4d are diagrams illustrating the manner in which an electron beam is converged by the device of this invention.
Figure 4B:
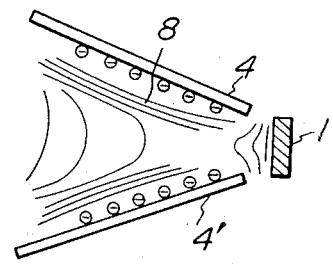
Figure 4C:
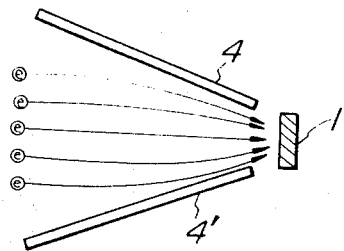
Figure 4D:
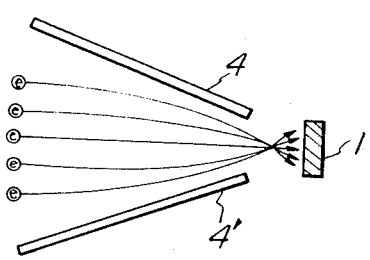

Next, an explanation will be given with reference to FIGS. 4a, 4b, 4c and 4d pertaining to how an electron beam is converged according to this invention when the thickness of the beam is larger than the minimum distance between the electrodes 4 and 4', or the width of the target 1. When a thick electron beam as shown in FIG. 4a proceeds straightly toward the target 1, and part of the electrons sticks to the electrodes 4, 4' and yields an electric field as shown in FIG. 4b, which constitutes an electrostatic lens and converges the beam as shown in FIGS. 4c and 4d. The difference in the mode of convergence between FIG. 4c and FIG. 4d is caused by the varied positions of the focal points of the electrostatic lenses due to the differences in the formation of the electrodes 4, 4', the values of the resistors 6, 6', the electric charge carried by the electron beams, and other minor factors. It will be understood that usually the deflecting action and the converging action are concurrently performed and impart no effect to the beam in the longitudinal direction of the target.

Further, it will never occur that the electron beam fails to reach the target 1 due to the negative charge accumulated on the electrodes 4, 4'. The reasons for that will be explained hereunder.

Figure 5B:
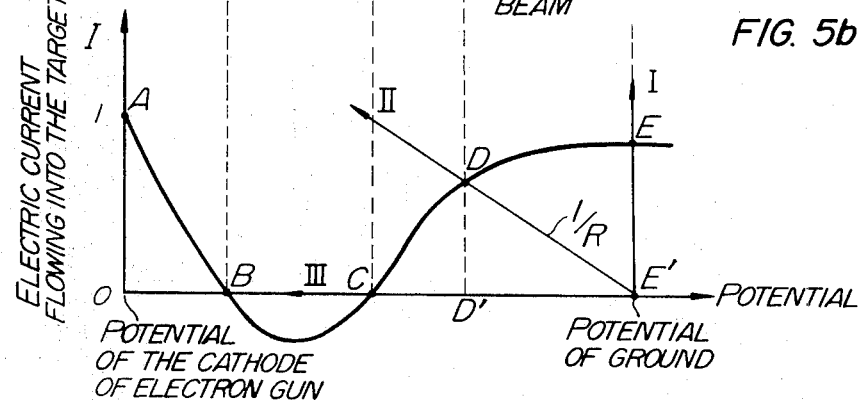

Referring to FIG. 5b, the curve passing the points A, B, C, D and E indicates how the electric current flowing into the electrode 4 varies in reference to the current (amount of electrons) emitted from the electron gun when the energy of the electron beam, that is, the potential of the electrons impinging on the electrode 4 against that of the cathode of the electron gun is varied. On the other hand, the ratio of secondary electron emission $\delta$ is zero when the energy of the impinging electrons is zero (corresponding to the point A). However, the ratio $\delta$ increases as the energy or voltage of the electrons rises, and exceeds 1 at the point G as shown in FIG. 5a. If the energy of the electrons is further increased, the ratio of secondary electron emission decreases again passing the value 1 after it reaches a maximum value. It is assumed that the electrode 4 is connected to the target 1 through an appropriate discharging resistor and that the cathode ray tube is grounded at the target 1. Therefore, the point E' in FIG. 5b corresponds to the ground potential.

Now, the potential of the electrode 4 is indicated as the potential D' corresponding to the intersecting point D of the curve and a straight line II which is drawn from the point E' at an angle I/R against the abscissa. It will be clear that if $R=0$, said potential is determined as E', and if R is infinite or extremely high, said potential corresponds to the point C. In an initial transient state, the initial potential of the electrode 4 is E', and the time when the potential reaches the respective stable points D and E depends on the static capacitance of the member 4 and the amount of electrons in the beam.

In an ordinary material, the potential difference between the point C and the cathode is in a range of several hundred volts to several thousand volts, while the potential difference between the point E' and the cathode is of the order of several tens of thousands volts. Thus, the point E' can be chosen at a higher potential than the point C.

In the above explanation, it is assumed that the electron beam continues to impinge on the electrode 4. However, in a stable state, the electron beam is prevented from impinging on said electrode 4 because of the deflection or the convergence due to the electric charge on said electrode 4 as described previously. Therefore, the potential of the electrode 4 is at a value between the points C and E' in any case, and the electron beam will never fail to reach the target 1.

Figure 6A:
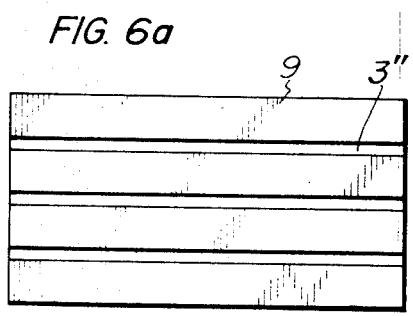
FIGS. 6a, 6b, 6c and 6d show two modified embodiments of this invention.
Figure 6B:
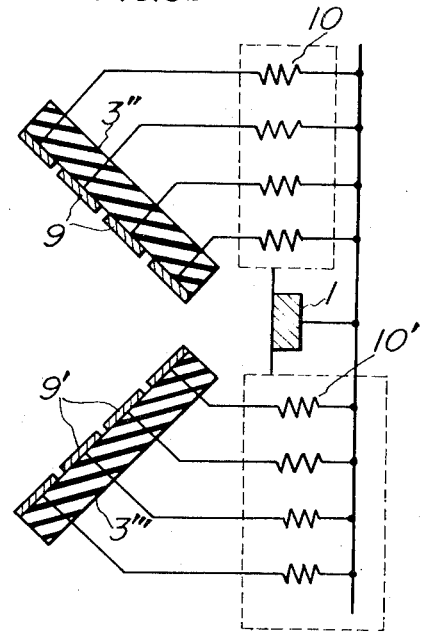

Referring to FIGS. 6a, 6b, 6c and 6d which show two other embodiments of this invention, the electrodes 4, 4' in FIGS. 2a and 2b are replaced by split electrodes 9, 9'. FIG. 6a is a view seen in the direction perpendicular to the main plane of the electrodes 9, and FIG. 6b is a schematic diagram of a device provided with such electrodes. With such an arrangement, the electric field for the above-described deflection and convergence can be controlled as desired. Further, resistors 10, 10' connected to each electrode can be respectively controlled. Therefore, if, for example, a longer time constant for the discharge is assigned to a more outsidely positioned electrode, the correction of the path of the electron beam can be achieved in such a manner that a coarse adjustment in the outer field is effected with a comparative long time constant of discharge and a fine adjustment in the inner field with a shorter time constant. It will be obvious that the control of the time constant can be effected, in an alternative arrangement, by varying the thickness of the electro-resistive layers corresponding to the layers 7, 7' shown in FIG. 2a and thereby varying the capacitance of the electrodes. The sensitivity of this device depends on the dimensional aspect of the structure to a significant extent.

Figure 6C:
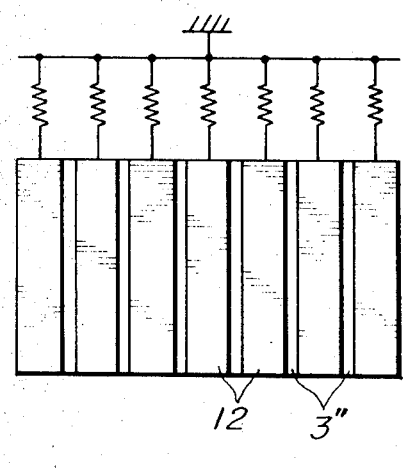
Figure 6D:
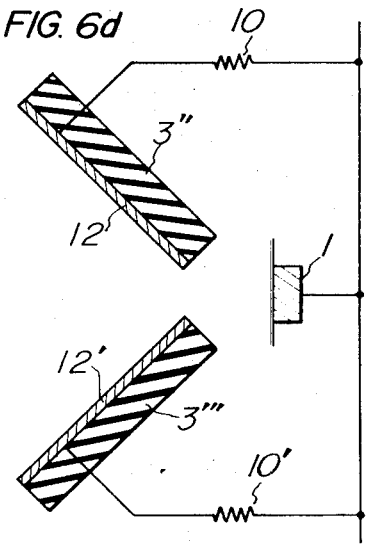

Embodiments shown in FIGS. 6c and 6d are provided with electrodes 12, 12' split in a direction vertical to the length of the target 1. This arrangement facilitates the compensation for the local inequality in the amount of the correction along the scanning path of the beam, that is, the length of the target 1. It will be needless to mention that a combination of the arrangement shown in FIGS. 6a, 6b with that shown in FIGS. 6c, 6d is possible.

Further two alternative embodiments of this invention are shown in FIGS. 7a and 7b. The arrangement shown in FIG. 7a corresponds to that shown in FIGS. 6a and 6b, except that the potentials of the electrodes are supplied from external voltage sources 14 instead of the electrons from the cathode. The deflecting and converging effects as described above can be obtained with such an arrangement, too. Further, it will be obvious that a similar arrangement using external voltage sources is applicable also to the embodiment shown in FIGS. 6c and 6d.

The arrangement shown in FIG. 7b which rather corresponds to that shown in FIG. 2b, is one of the simplest but still effective embodiments of this invention, in which the electrodes 4 and 4' are connected together with a conductive wire 15 either within or without the tube. Accordingly the electrodes 4 and 4' are at an equal potential. The thus connected electrodes 4, 4' are supplied with a negative potential from an external voltage source 16 thereby to constitute an electrostatic lens, by which a thick electron beam is converged and a misdirected beam is corrected so as to hit the target 1.

Further, in an embodiment shown in FIG. 7c, the conductor 5' and the external voltage source 16 are eliminated from the embodiment shown in FIG. 7b. With this arrangement too, if the electron beam is missing the target, it impinges on the electrode 4 or 4' and lowers the potential thereof, thereby forming an electrostatic lens. As the effect of the lens becomes more intense, the beam moves toward the target and at last hits the target. The electric charge on the electrode is maintained at a constant quantity except for a small fraction which leaks through the insulators 3'', 3''' and which is readily supplemented. In this embodiment, it is easy to bring the spot of an electron beam correctly to the target from a position at a distance from said target ten times the width of the target.

As described above, according to this invention, the position of an electron beam is automatically corrected by means of a simple-structured device and concurrently the beam is focused on a narrow target. Therefore, if the invention is applied to a recording tube or other similar electron tubes, a reliable operation of the electron tube is ensured, and the resolution and other important functions of the tube will be greatly improved.

What we claim is:

1. A device for correcting the path of an electron beam toward a narrow target, comprising a pair of opposite electrodes located in proximity to said target and mutually convergent in the direction of said target to define an aperture for admitting the electron beam to said target, said electrodes having established on the surfaces thereof electric fields to direct the electron beam inwardly, whereby the major portion of said electron beam is caused to hit said target, said electrodes being made of a conductive material of relatively low ratio of secondary electron emission, a pair of conductors, and a pair of resistors interposed between each of said electrodes and each of said conductors, whereby the electric potentials built up on the surfaces of said electrodes by the absorption of the electrons of said beam are discharged at a rate depending upon a time constant determined by the resistance of said resistors and the electrostatic capacitance of said electrodes.

2. A device as set forth in claim 1, wherein said electrodes are electrically connected with each other and a pair of insulator blocks made of a dielectric material are attached to the outer surfaces of said electrodes.

3. A device as set forth in claim 2, wherein said electrodes are further connected in series with said target through a conductor and an external voltage source.

4. A device as set forth in claim 1, wherein said electrodes are electrically connected with each other and with said target through a pair of resistors.

5. A device as set forth in claim 4, wherein each of said electrodes is divided into a plurality of sections extending in parallel with the length of said target, means to insulate and separate said sections from each other and means electrically to connect each section with said target through respective resistors.

6. A device as set forth in claim 5, wherein each of said sections is further divided into a plurality of sub-sections extending perpendicularly to the length of said target, means to insulate and separate each of said sub-sections from each other and means electrically to connect each sub-section with said target through respective resistors.

7. A device as set forth in claim 4, wherein each of said electrodes is divided into a plurality of sections extending perpendicularly to the length of said target, means to insulate and separate said sections from each other and means electrically to connect each section with said target through respective resistors.

8. A device as set forth in claim 1, wherein each of said electrodes is divided into a plurality of sections extending in parallel with the length of said target, means to insulate and separate each of said sections from each other and means electrically to connect each section with said target through respective external voltage sources.

9. A device as set forth in claim 8, wherein each of said sections is further divided into a plurality of sub-sections perpendicularly to the length of said target, means to insulate and separate each of said sub-sections from each other and means electrically to connect each sub-section with said target through respective external voltage sources.

10. A device as set forth in claim 1, wherein each of said electrodes is divided into a plurality of sections extending perpendicularly to the length of said target, means to insulate and separate each of said sections from each other and means electrically to connect each section with said target through respective external voltage sources.

References Cited

UNITED STATES PATENTS 2,409,499  10/1946  Kilgore _____ 313—80 X

RODNEY D. BENNETT, Primary Examiner

T. H. TUBBESING, Assistant Examiner

U.S. Cl. X.R.

313—80; 315—18, 31